(12) United States Patent
Chhabra

(10) Patent No.: US 8,611,324 B2
(45) Date of Patent: *Dec. 17, 2013

(54) LOCATION AWARE BACKGROUND ACCESS POINT SCANNING FOR WLAN

(71) Applicant: Marvell World Trade Ltd., St. Michael (BB)

(72) Inventor: Kapil Chhabra, Sunnyvale, CA (US)

(73) Assignee: Msrvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,709

(22) Filed: Dec. 10, 2012

(65) Prior Publication Data
US 2013/0094390 A1 Apr. 18, 2013

Related U.S. Application Data

(63) Continuation of application No. 12/252,965, filed on Oct. 16, 2008, now Pat. No. 8,331,335.

(60) Provisional application No. 60/981,616, filed on Oct. 22, 2007.

(51) Int. Cl.
*H04W 4/00* (2009.01)

(52) U.S. Cl.
USPC ............ 370/338; 370/331; 370/401; 455/440

(58) Field of Classification Search
None
See application file for complete search history.

(56) References Cited

U.S. PATENT DOCUMENTS

| 7,551,579 | B2 | 6/2009 | Alizadeh-Shabdiz et al. |
| 2002/0187792 | A1 | 12/2002 | Kato et al. |
| 2004/0057408 | A1 | 3/2004 | Gray |
| 2004/0156372 | A1 | 8/2004 | Hussa |
| 2004/0190478 | A1 | 9/2004 | Backes et al. |
| 2005/0090250 | A1 | 4/2005 | Backes |
| 2006/0148486 | A1 | 7/2006 | Kim et al. |
| 2006/0274792 | A1* | 12/2006 | Abhishek et al. ............. 370/913 |
| 2007/0082677 | A1 | 4/2007 | Donald Hart et al. |
| 2007/0091847 | A1 | 4/2007 | Lee |
| 2007/0147317 | A1 | 6/2007 | Smith et al. |
| 2007/0184835 | A1 | 8/2007 | Bitran et al. |
| 2007/0217377 | A1 | 9/2007 | Takeuchi |
| 2007/0258409 | A1 | 11/2007 | Alizadeh-Shabdiz et al. |
| 2008/0117862 | A1 | 5/2008 | Yeshayahu et al. |
| 2008/0137621 | A1 | 6/2008 | Bheda et al. |
| 2008/0261615 | A1 | 10/2008 | Kalhan |
| 2009/0080381 | A1 | 3/2009 | Yashar et al. |
| 2010/0232365 | A1 | 9/2010 | Lu et al. |

FOREIGN PATENT DOCUMENTS

EP 1638360 3/2006

OTHER PUBLICATIONS

Chumchu et al. "IEEE 802.11 Handoffs: Analysis and Enhancement", The 21$^{st}$ Int'l Technical Conf. on Circuits/Systems, Computers and Communications, Thailand, *The Institute for Electrical and Electronics Engineers*, pp. III-77-III-80 (2006).
International Search Report and Written Opinion for International Application No. PCT/US2008/080192 (Feb. 17, 2009).

(Continued)

*Primary Examiner* — Bob Phunkulh

(57) ABSTRACT

Respective distances between a communication device and a plurality of wireless local area network (WLAN) access points are determined. One of the plurality of WLAN access points with which the communication device is to associate is selected based on the determined distances.

32 Claims, 8 Drawing Sheets

(56) References Cited

OTHER PUBLICATIONS

International Preliminary Report on Patentability for International Application No. PCT/US2008/080192 (Apr. 27, 2010).

Herman et al., "Investigation of IEEE 802.11k-based Access Point Coverage Area and Neighbor Discovery," 32nd IEEE Conference on Local Computer Networks, *The Institute for Electrical and Electronics Engineers*, 6 pages (Oct. 2007).

IEEE Std 802.11k™-2008, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs," *The Institute for Electrical and Electronics Engineers*, 244 pages (Jun. 2008).

Office Action in Chinese Application No. 200880112755.3 dated Sep. 27, 2012.

Second Office Action in corresponding Chinese Patent Application No. 200880112755.3 issued Jun. 27, 2013.

\* cited by examiner

LOCATION AWARE BACKGROUND ACCESS POINT SCANNING FOR WLAN

CROSS-REFERENCE TO RELATED APPLICATION

The present application is a continuation application of U.S. application Ser. No. 12/252,965, now U.S. Pat. No. 8,331,335, entitled "Location Aware Background Access Point Scanning for WLAN," filed Oct. 16, 2008, which claims the benefit of U.S. Provisional Application No. 60/981,616, entitled "LOCATION AWARE BACKGROUND SCAN," filed on Oct. 22, 2007. The above-referenced applications are hereby incorporated by reference herein in their entireties.

FIELD OF THE DISCLOSURE

The present disclosure relates generally to communication systems, and more particularly, to wireless communication systems that employ position information to enhance the performance of wireless data communication.

BACKGROUND

Many communication devices such as mobile phones, laptops, or personal digital assistants (PDAs) now are provided with capabilities to allow them to communicate with a wireless local area network (WLAN).

Communication devices may connect with a WLAN upon detection of an access point. To detect access points that are in range, the communication device may actively or passively search for access points having signals that have an acceptable quality, such as having a received signal strength indicator (RSSI) that is above a threshold. A communication device that falls out of the range of an associated access point may attempt to connect with one or more other access points, if available. Since access points are not always readily available, WLAN coverage may be spotty with a mobile device such as a mobile phone, a PDA, etc., and thus mobile communication devices may be continually searching for additional access points with which to connect. For instance, a communication device such as a mobile phone operating in a long range mobile phone network, such as global system for mobile communication (GSM), may continually perform a background scan for WLAN access points, looking for access points having acceptable RSSI levels.

RSSI is generally a measurement of the power of a received signal. Currently, communication devices with WLAN capabilities select access points based on RSSI. For instance, a communication device whose RSSI drops below a certain threshold may seek to connect to another access point with an RSSI above the threshold, if available.

A communication device may scan a wireless communication network that is compliant with the Institute for Electrical and Electronics (IEEE) 802.11 Standard handoff algorithm for available access points using one of two known channel scanning methods, passive scanning and active scanning. Referring to FIG. 1, an example wireless network 100 compliant with the IEEE 802.11 Standard handoff algorithm includes a communication device 102 and a plurality of access points 104-114, each at potentially different distances from the communication device 102. Each access point 104-114 (or at least access points in close proximity or with overlapping coverage areas) may be operating on a different communication channel. To facilitate the discovery of the access points, each access point periodically may transmit a signal often referred to as a beacon to let other communication devices know of its presence. The beacon will include various information including a channel number to indicate which channel it is using. In passive scanning, the communication device 102 may switch to each of a plurality of potentially available channels and listen for a beacon. For each channel, if a beacon is received and an RSSI is above a threshold, the channel/access point may be noted as available. After scanning all the channels, the communication device 102 may choose one of the available access points (if there is more than one) and attempt to associate with the chosen access point. For example, the communication device 102 may choose the access point with the highest RSSI.

When a communication device with WLAN capabilities powers up in an already existing wireless network, it may utilize passive scanning to find available wireless access points and determine with which access point to associate. Passive scanning may also be used when the device is already associated with an access point. For example, if the communication device 102 is a mobile device, it may continuously perform passive scanning in case the connection with the current access point is suddenly lost or degrades. Additionally, if the RSSI for an access point with which the communication device 102 is associated has fallen below a threshold (for example, because the communication device 102 has moved further away from the associated access point), the communication device 102 may utilize passive scanning to find another access point with which to associate. If there are fourteen channels and it is assumed that beacons are transmitted at 100 millisecond (ms) intervals, the device 102 may listen for beacons for approximately 100 ms at each channel, for instance. Thus, the device 102 may spend 1.4 seconds (100 ms/channel×14 channels) scanning for beacons.

In active scanning, the communication device 102 may maintain a list of access points in range of the device 102. The communication device 102 may transmit a probe request signal on each of the channels associated with the access points on the list, except for the access point with which it is currently associated. After transmitting a probe request signal, the communication device 102 may wait a period of time for a response from the corresponding access point. The response may indicate the RSSI of the channel and/or the channel load. Once the communication device 102 has scanned all channels corresponding to the list of access points (except the currently associated access point), the device 102 may seek to disconnect from the current access point and connect to an access point with a higher RSSI or a better combination of RSSI and channel load, for example.

SUMMARY OF THE DISCLOSURE

In one embodiment, a method includes determining respective distances between a communication device and a plurality of wireless local area network (WLAN) access points, and selecting one of the plurality of WLAN access points with which the communication device is to associate based on the determined distances.

In another embodiment, an apparatus comprises a wireless local area network (WLAN) channel scanning control unit configured to determine respective distances between a communication device and a plurality of WLAN access points, and select one of the plurality of WLAN access points with which the communication device is to associate based on the determined distances.

In yet another embodiment, a method includes comparing a velocity of a communication device to a threshold, and disabling a wireless local area network (WLAN) access point scanning process based on comparing the velocity to the threshold.

In still another embodiment, an apparatus, comprises a wireless local area network (WLAN) channel scanning control unit configured to compare a velocity of a communication device to a threshold, and disable a WLAN access point scanning process based on comparing the velocity to the threshold.

DETAILED DESCRIPTION

Many communication devices today incorporate a positioning system such as a global positioning system (GPS) receiver with a WLAN interface. As will be described below, location information generated by the positioning system can be utilized to help improve the performance of the WLAN interface.

Figure 1:
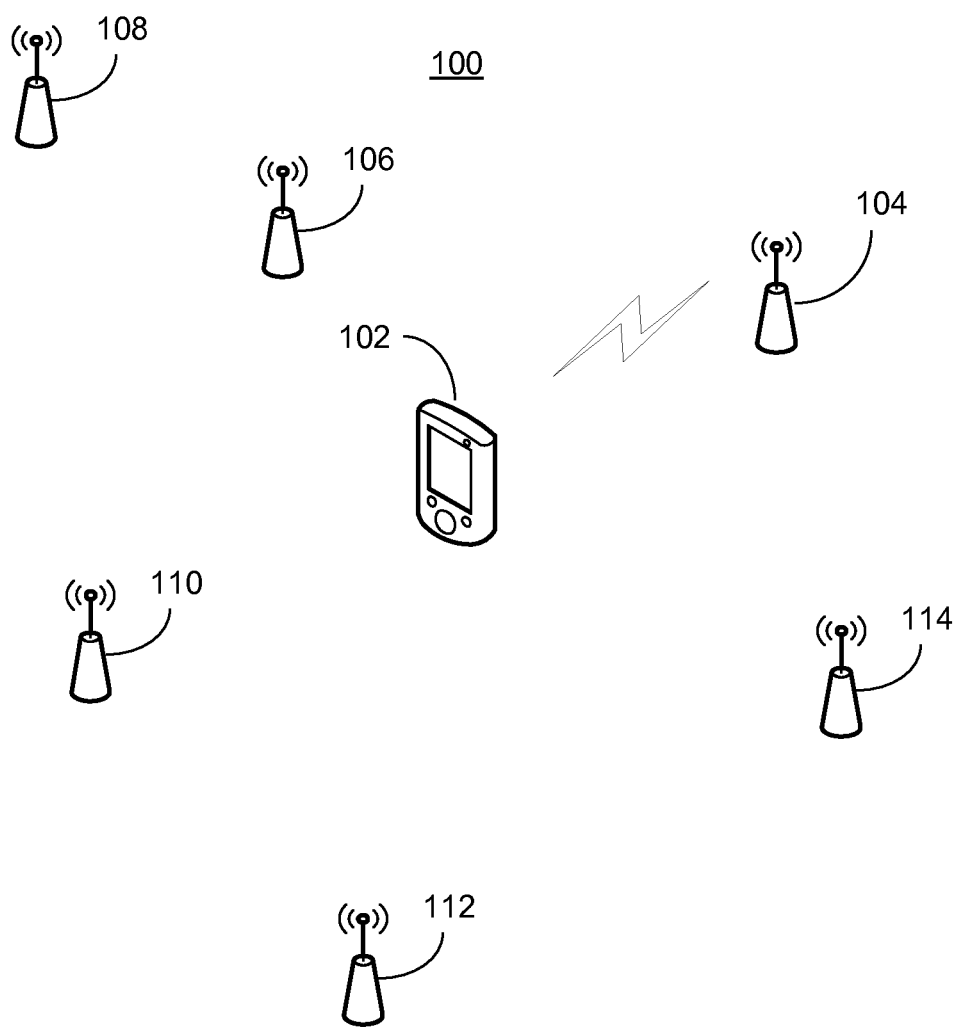
FIG. 1 is a block diagram of an implementation of a wireless local area network.
Figure 2:
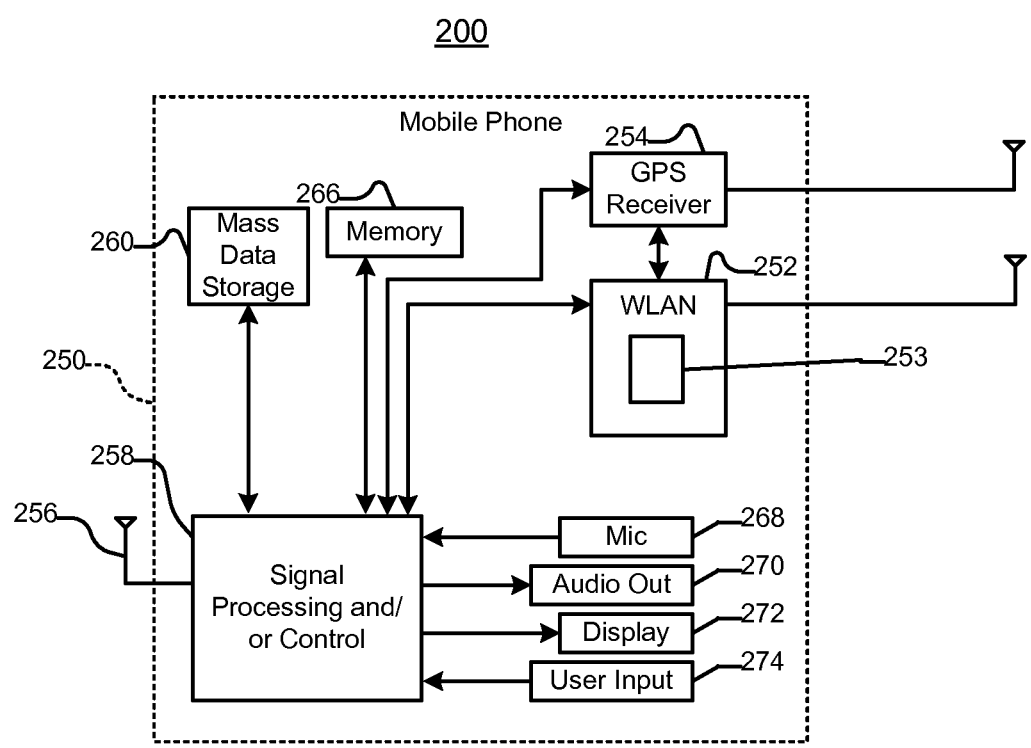
FIG. 2 is a block diagram of a mobile phone that may utilize location awareness techniques such as described herein.

FIG. 2 is a block diagram of an example mobile phone 250 that includes both a WLAN interface 252, having a WLAN channel scanning control unit 253, and a GPS receiver 254. The mobile device 250 also may include a cellular antenna 256, signal processing and/or control circuits, which are generally identified in FIG. 2 at 258, a mass data storage 264, and/or a memory 266. In some implementations, the mobile phone 250 includes a microphone 268, an audio output 270 such as a speaker and/or audio output jack, a display 272 and/or an input device 274 such as a keypad, pointing device, touch pad, voice actuation and/or other input device. In some implementations, the input device 274 may include a touch screen associated with the display 272. Signal processing and/or control circuits 258 and/or other circuits (not shown) in mobile phone 250 may process data, perform coding and/or encryption, perform calculations, format data and/or perform other mobile phone functions.

Mobile phone 250 may communicate with mass data storage 264 that stores data in a nonvolatile manner such as optical and/or magnetic storage devices for example hard disk drives HDD and/or DVDs. Mobile phone 250 may include a memory 266 such as RAM, ROM, low latency nonvolatile memory such as flash memory and/or other suitable electronic data storage.

The GPS receiver 254 may generate location information indicative of a location of the mobile phone 250. As will be described in more detail below, the location information may be utilized to enhance the performance of the WLAN interface 252. The WLAN interface 252 enables the mobile phone 250 to communicate via a WLAN. For example, it may be preferable to utilize a WLAN for voice or data communications as compared to utilizing wide-area cellular network when out of range of the cellular network but in range of the WLAN, when communication via the WLAN may be less expensive than communication via the cellular network, etc.

A communication device with a positioning system such as the mobile phone 250 may also be aware of its velocity. For example, the position information may be analyzed over time to generate velocity information. In the example device 250, the GPS receiver 254 may generate velocity information. Optionally, some other component such as the WLAN interface 252 or the signal processing/control block 258 may generate velocity information based on the position information generated by the GPS receiver 254. The position information and/or the velocity information may be utilized to enhance the power efficiency of the WLAN interface 252, for example. For instance, if the mobile phone 250 is traveling at high speeds (e.g., in an automobile), the WLAN interface 252 might continuously scan for WLAN access points because the mobile phone 250 may be quickly entering and leaving the coverage areas of access points. In such a scenario, WLAN communication cannot occur effectively. Yet, the continuous scanning process may consume power, which may be a limited resource if the mobile phone 205 is operating on battery power, for example. But if the mobile phone 250 is aware of its velocity, the WLAN scanning process could be disabled, thereby reducing power consumption.

The WLAN scanning control unit 253 may receive position information and/or velocity information, such as from the GPS receiver 254. The WLAN scanning control unit 253 may be configured to control WLAN scanning based on the position information and/or velocity information. Although the WLAN scanning control unit 253 is illustrated in FIG. 2 as being a component of the WLAN interface 252, the WLAN scanning control unit 253 can be implemented in other components of the mobile phone 250, such as in the signal processing and/or control circuits 258.

Figure 3:
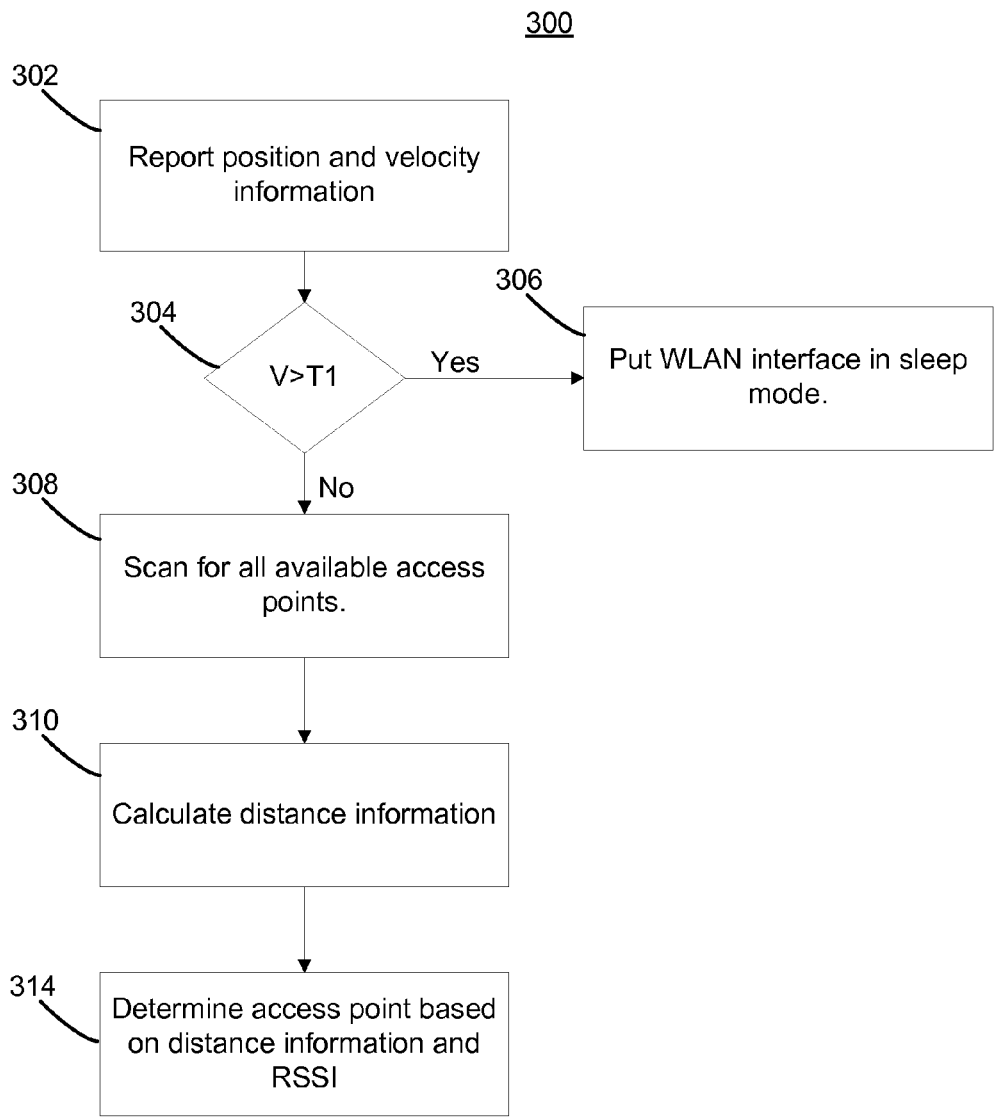
FIG. 3 is a flow diagram of an example method for implementing a sleep mode for a communication device based on velocity.

FIG. 3 is a flow diagram of an example scanning method 300 that utilizes velocity information and position information. The method 300 may be implemented by a communication device such as the example mobile phone 250 of FIG. 2. For ease of explanation, the method 300 will be described with reference to FIG. 2. Of course, the method 300 may be implemented by a communication device different than the mobile phone 250, and the mobile phone 250 may utilize a different scanning method that utilizes velocity and/or position information. The method 300 may be utilized when a mobile device is not currently associated with an access point, for example.

At a block 302, a positioning system such as the GPS receiver 254 may report position and velocity information. For example, the GPS receiver 254 may send the position information and the velocity information to the WLAN scanning control unit 253. Alternatively, if the positioning system does not itself generate velocity information, it may merely report the position information. In this scenario, the velocity information may be generated (by the s WLAN scanning control unit 253, for example) based on position information generated over time by the positioning system. Then, at a block 304, it may be determined if the velocity is above a threshold T1. Because an access point may have a limited range, threshold T1 may be set to a velocity at which the RSSI of an access point will not quickly diminish, relatively speaking. For example, threshold T1 may be set at 2 m/s, the speed at which a person would typically walk. At this velocity, the communication device can be expected to stay within range of the access point for some amount of time that would permit effective, practical, and/or acceptable WLAN communication. But at a higher speed, such as 8 m/s, WLAN communication may become ineffective because the communication device would be expected to stay within range of any one access point for only a short amount of time. Thus, data communications may become unacceptably slow and/or intermittent because too much time is spent attempting to associate with and disassociating with different access points, scanning for new access points, etc., or the device intermittently and/or for unacceptably long periods goes out of range of any access point. Of course, the threshold T1 may be set to a variety of other speeds besides 2 m/s, and different thresholds may be utilized for different implementations. The WLAN scanning control unit 253, for example, may determine if the velocity is above a threshold T1. If the velocity is above the threshold T1, the WLAN interface 252 may be put in a sleep mode or at least the scanning process may be disabled at a block 306. The WLAN scanning control unit 253, for example, may cause the WLAN interface 252 to go into the sleep mode or at least cause the scanning process may be disabled. In this mode, the mobile phone 250 may conserve power that it may otherwise be inefficiently using by continuously scanning for access points that may quickly fall out of range or with which it may even not be able to associate. If the velocity information is less than or equal to the threshold T1 then at a block 308, the mobile phone may scan for available access points, such as by using a passive scanning technique. The WLAN scanning control unit 253, for example, may enable or cause the WLAN interface 252 to scan for available access points.

Each of at least some access points may be aware of its location, and this access point location information may be transmitted to the mobile phone 250 during the scanning block 308. Additionally, the mobile phone 250 also may be able to determine the RSSI associated with each access point. Thus, after the block 308, the device 250 may be aware of the RSSI associated with each of one or more access points and position information for possibly one or some or all (or possibly none) of the access points.

At a block 310, respective distances between the mobile device and each of the access points (for which it has position information) may be calculated using the position information generated by the GPS receiver 254. For example, the WLAN scanning control unit 253 may calculate the distance information. In one particular implementation in which position information is indicated by coordinate triplets (e.g., an x coordinate, a y coordinate, and a z coordinate), a distance between the mobile device 250 and an access point may be calculated based on:

$$d = \sqrt{(X_{AP} - X_{DEV})^2 + (Y_{AP} - Y_{DEV})^2 + (Z_{AP} - Z_{DEV})^2},$$ (Equation 1)

where:
$(X_{AP}, Y_{AP}, Z_{AP})$ are the coordinates of the access point, and $(X_{DEV}, Y_{DEV}, Z_{DEV})$ are the coordinates of the mobile device.

Of course, distance information may be determined using any of a variety of techniques and may vary depending upon the format of the position information.

At a block 314, an access point with which to associate is determined based on the distances calculated at the block 310. Determining the access point with which to connect may be based on other information as well such as RSSI information, channel load information (such as channel load indicators), etc. In one particular implementation, the nearest access point in which the RSSI is above a threshold T2 may be chosen. The threshold T2 may be at a level corresponding to a sufficient RSSI power level. The threshold T2 may be chosen depending on the particular implementation.

The WLAN scanning control unit 253, for example, may determine or select the access point. Selecting an access point based on location may provide an advantage over typical passive and active scanning techniques, on average. For example, if the closest access point is chosen, the mobile device may be expected, on average, to stay within its coverage area for a longer time as compared to choosing an access point that is farther away. Of course choosing the closest access point may not always result in staying in a coverage area for the longest time. For example, if the mobile phone is moving away from the closest access point, the mobile phone may stay within the coverage area of another access point which the mobile phone is moving towards. Thus, optional implementations may include determining direction information, and determining an access point with which to associate may be further based on the direction information. The direction information may indicate a direction in which the mobile device is traveling, and the direction information may be generated by the positioning system (e.g., GPS receiver 254), the WLAN interface or some other component such as the signal processing/control block 258.

Figure 4:
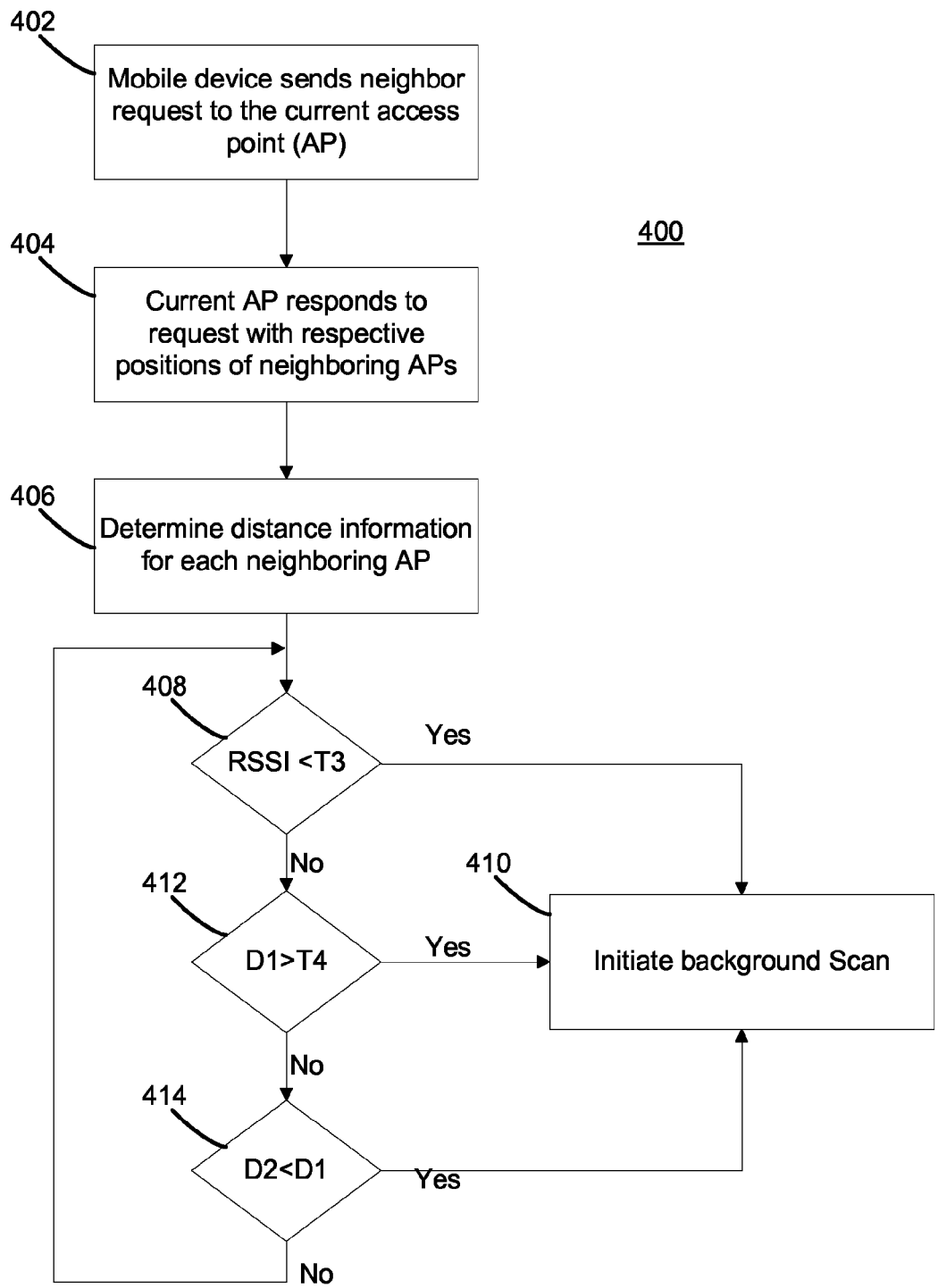
FIG. 4 is a flow diagram of an example method for testing conditions in which a background scan on a set of neighboring channels may occur.

FIG. 4 is a flow diagram of an example method 400 for determining, based on position information, whether to initiate background scanning when a mobile device is already associated with an access point. The method 400 may be implemented by a communication device such as the example mobile phone 250 of FIG. 2. For ease of explanation, the method 400 will be described with reference to FIG. 2. Of course, the method 400 may be implemented by a communication device different than the mobile phone 250, and the mobile phone 250 may implement methods other than the method 400.

At a block 402, the mobile device may send a neighbor information request to an access point with which it is currently associated (the "current access point"). The neighbor information request may be a request for information about access point neighbors of the current access point, such as the channels on which each neighbor is operating, the location of each neighbor, etc. For example, if the current access point and neighboring access point are compliant with the IEEE 802.11k Standard, they may exchange information with each other, and the current access point may be aware of the neighbors and have information about the neighbors. The request for information sent by the mobile device may be a neighbor request frame specified in the IEEE 802.11k Standard, for example. With the mobile phone 250, the WLAN scanning control unit 253, for example, may cause the request to be sent via a WLAN link with the current access point.

Then, at a block 404, the current access point may respond to the request (block 402) by, for example, sending information to the mobile device regarding neighboring access points, such as the position of each neighboring access point, the channel on which each neighboring access point is operating, channel load information for each neighboring access point, etc. With the mobile phone 250, the WLAN interface 252 may receive the response via the WLAN link with the current access point.

At a block 406, respective distances between the mobile device and the neighboring access points may be calculated. With the mobile phone 250, the WLAN scanning control unit 253, for example, may calculate the distances. Table 1 is an example list of neighboring access points arranged in order of increasing distance from the mobile phone 250. In this example, positions an x, y, z coordinate format, but any other suitable position information format may be used. In Table 1, it is assumed for simplicity that the mobile phone 250 is located at coordinates (0,0,0). In reality, however, the mobile phone 250 will typically not be located at position (0,0,0). Table 1 also lists the channel via which each access point communicates. Information such as the information of Table 1 may be obtained based on execution of the blocks 404 and 406. Such information may be stored in a memory. With the mobile phone 250, the information may be stored in a memory coupled to or included in the WLAN scanning control unit 253, for example. The information could be organized in any of a variety of formats to facilitate ease of ranking or sorting based on one or more parameters such as distance, channel load, etc. For example, the information regarding access points could be ordered based on the distance information, such as in Table 1. With the mobile phone 250, the WLAN scanning control unit 253, for example, may calculate the distance information and cause the distance information to be stored.

TABLE 1

| | AP Position | AP Channel | Distance (AP <-> DEV) |
|---|---|---|---|
| AP1 | (0, 4, 0) | 6 | 4 |
| AP2 | (3, 4, 0) | 1 | 5 |
| AP3 | (8, 0, 0) | 11 | 8 |

Blocks 408, 412, and 414 represent conditions that a mobile device may check to decide whether to perform a background scan. The order in which each of the three conditions 408, 412, and 414 are checked may vary. Generally, as long as at least one of the three conditions 408, 412, and 414 is met, a background scan may be performed. With the mobile phone 250, the WLAN scanning control unit 253, for example, may check the three conditions.

At the block 408, it may be determined if the RSSI of the current access point is less than a threshold T3. Threshold T3 may be, for example, a minimum requirement corresponding to an RSSI level sufficient to sustain a connection. For example, the threshold T3 may be the same as the threshold T2. Of course, the threshold T3 may be different than the threshold T2, such as higher or lower than the threshold T2. The WLAN scanning control unit 253, for example, may determine if the RSSI of the current access point is less than the threshold T3. If the RSSI of the associated access point falls below the threshold T3, then at a block 410, the mobile phone 250 may initiate a background scan on a set of channels corresponding to the neighboring access points determined based on the information received at the block 404. The block 410 may be implemented using a variety of techniques, including known techniques. For example, the block 410 may be implemented using a conventional active scanning technique. Alternatively, the block 410 may be implemented using a background scanning technique utilizing position information. An example method for background scanning technique utilizing position information will be described below with reference to FIG. 5. With the mobile phone 250, the WLAN scanning control unit 253, for example, may cause the background scanning process to be initiated. With the mobile phone 250, the WLAN interface 252 may implement the background scanning process.

If it is determined at the block 408 that the RSSI of the current access point is greater than the threshold T3, then the flow may proceed to a block 412, at which it may be determined if a distance, D1, between the mobile device and the current access point is greater then a threshold T4. The threshold T4 may be set using a variety of techniques. For example, the threshold T4 may be set to a distance beyond which it is estimated that the RSSI may begin to quickly degrade below an acceptable level. If the distance D1 is greater than threshold T4, then the flow may proceed to the block 410.

On the other hand, if the distance D1 is not greater than threshold T4 then the flow may proceed to the block 414, at which it may be determined if the distance D1 is greater than a distance D2. The distance D2 may be a distance between the mobile device and a nearest neighboring access point (other than the current access point). If the distance D2 is less than the distance D1 then the flow may proceed to the block 410.

Checking the conditions corresponding to the blocks 408, 412, 414 optionally may be repeated some number of times, for some time period, until some event occurs, etc. For example, checking the conditions corresponding to the blocks 408, 412, 414 may be repeated until it is determined that the method 400 should be restarted. Checking the conditions corresponding to the blocks 408, 412, 414 may be implemented by the WLAN scanning control unit 253, for example.

In an alternative implementation, checking the conditions corresponding to the blocks 408, 412, 414 may not be performed when it is determined that a velocity of the mobile device is above a velocity threshold, such as the velocity threshold discussed with respect to FIG. 3.

Figure 5:
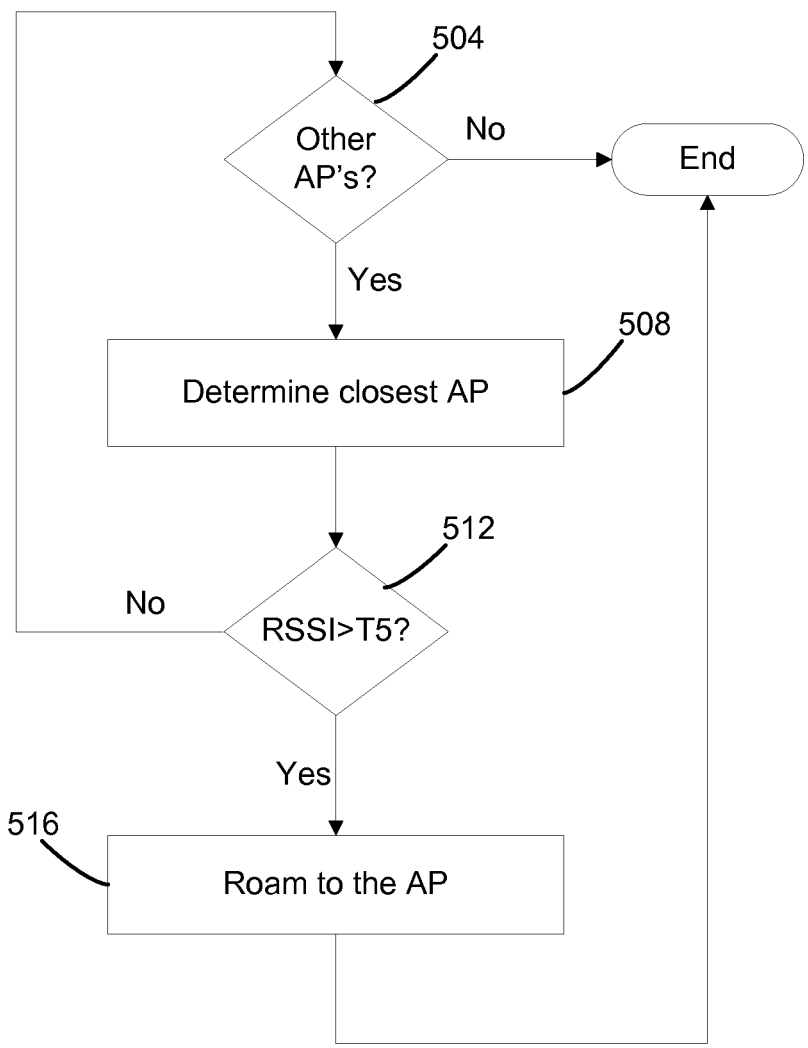
FIG. 5 is a flow diagram of an example method for a communication device which may be aware of the location of the neighboring access points may perform a background scan.

FIG. 5 is a flow diagram of an example background scanning method 500 that utilizes position information. The method 500 may be implemented by a communication device such as the example mobile phone 250 of FIG. 2. For ease of explanation, the method 500 will be described with reference to FIG. 2. Of course, the method 500 may be implemented by a communication device different than the mobile phone 250, and the mobile phone 250 may implement methods other than the method 500.

The method 500 may be implemented by a mobile device when the mobile device is currently associated with an access point (the current access point). If the method 400 is implemented by the mobile device, the block 410 may include the method 500. The method 500 may begin at a block 504, at which it may be determined if there are other neighboring access points (besides the current access point) with which the mobile device might be able to associate. Determining if there are other neighboring access points may be implemented based on information obtained from previously performed scanning procedures such as a passive scan or an active scan. In one implementation, determining if there are other neighboring access points may be implemented based on information obtained from a procedure such as described with respect to blocks 402 and 404 of FIG. 4. For instance, if the mobile device and the current access point are compliant with the IEEE 802.11k Standard, determining if there are other neighboring access points may be implemented based on information obtained in response to a neighbor request frame. If there are no other access points with which the mobile device might be able to associate, the method 500 may end.

On the other hand, if there are one or more other access points with which the mobile device might be able to associate, the flow may proceed to a block 508. At the block 508, the closest other access point may be determined. The block 508 may be implemented based on distance information for the one or more other access points (i.e., respective distances between the mobile device and each of the other access points) calculated according to a method such as described with respect to the block 406 of FIG. 4, for instance. Distance information for the one or more other access points may have been previously calculated and stored in a memory, and this information may be analyzed to determine the closest other access point. For example, access points could be ranked or ordered according to their distance from the mobile device, and the closest access point could be determined based on the order or ranking. Optionally, distance information for the other access points could be compared to determine the closest access points.

At a block 512, it may be determined whether an RSSI corresponding to the access point determined at the block 508 is above a threshold T5. The threshold T5 may be selected in a variety of manners. As just one example, the threshold T5 may be selected based on the threshold T3 and a hysteresis parameter (e.g., T5=T3+hysteresis parameter). As another example, the threshold T5 may be selected to be the same as the threshold T3.

If the RSSI is greater than T5, the flow may proceed to the block 516, at which the mobile device may attempt to roam to the access point that was determined at the block 508. On the other hand, if the RSSI is less than T5, the flow may proceed back to the block 504. In particular, the access point previously determined at the block 508 may be removed from consideration in terms of implementing the next round of the blocks 504, 508, 512. In this way, the next closest access point will next be considered. Thus, the blocks 504, 508, 512 may be repeated, evaluating the next closest access point each time, until there are no more other access points to consider or until an access point with an RSSI greater than T5 is found.

In an alternative implementation, it may be determined if a velocity of the mobile device is greater than a velocity threshold (such as the threshold T1 discussed with respect to FIG. 3. Depending on when it is determined that the velocity is greater than the velocity threshold, the method 500 may be not started, terminated if already started, etc.

Generally speaking, the method 500 analyzes other access points in an order, wherein the order is based on the distance of the other access points to the mobile device. The other access points are analyzed in the order to determine an access point to which to roam. Generally speaking, it can be expected that an access point that is closer to the mobile device will tend to have a higher associated RSSI as compared to an access point that is further away. In this way, the method 500 may find another access point having an acceptable RSSI more quickly than other methods that do not utilize position information. Of course, in other implementations, the order may be based on other information in addition to the position information, such as RSSI, channel load, etc.

With the mobile phone 250, each of the blocks 504, 508, 512, 516 may be implemented by the WLAN scanning control unit 253, for example. For example, if the WLAN scanning control unit 253 is implemented in the signal processing/control block 258, the WLAN scanning control unit 253 could implement the method 500 based on information from the WLAN interface 252 and by sending control information to the WLAN interface 252, such as a signal instructing the WLAN interface 252 to attempt to roam to a particular access point. As another example, if the WLAN scanning control unit 253 is implemented in the WLAN interface 252, the WLAN scanning control unit 253 could implement the method 500 based on information from other components of the WLAN interface 252 and by sending control information to other components of the WLAN interface 252, such as a signal instructing the WLAN interface 252 to attempt to roam to a particular access point. More generally, the WLAN scanning control unit 253 may analyze other access points in an order, wherein the order is based on the distance of the other access points to the mobile device, to determine an access point to which the WLAN interface 252 should attempt to roam.

As discussed above, one or more of the methods 300, 400, and 500, or portions of these methods (or similar methods) may be implemented by a WLAN channel scanning control unit, which in turn may be implemented in hardware, firmware, software, or any combination of hardware, firmware, and/or software. The WLAN channel scanning control unit may be a component of a WLAN interface, for example. Alternatively, the WLAN channel scanning control unit may be a component of another subsystem of a communication device, such as a control block separate from the WLAN interface. In this implementation, the WLAN channel scanning control unit may be coupled to the WLAN interface.

Although the example mobile phone 250 was described as including a GPS receiver 254, it will be understood that other positioning systems may also be utilized such as other satellite-based positioning systems. Also, non-satellite-based positioning systems may also be utilized. For example, if the mobile device is a mobile phone, a positioning system could determine position information based on signals received from multiple cellular phone base stations, or based on signals received from multiple WLAN access points. A positioning system may utilize a triangulation type method, for example, to determine a position of the mobile phone 250 based on the signals received from the multiple base stations or access points. Also, the positioning system could be located outside of the mobile phone 250. For instance, a positioning system in a cellular phone base station or a WLAN access point could determine position information based on signals received from the mobile phone 250 at multiple cellular phone base stations or at multiple WLAN access points. Such a positioning system may utilize a triangulation type method, for example, to determine a position of the mobile phone 250 based on the signals received at the multiple base stations or access points. The positioning system could then transmit the determined position information to the mobile phone 250 via a cellular phone link or a WLAN link.

Although the above example scanning methods that utilize position and/or velocity information were described in the context of a mobile phone, it will be understood that similar methods may be utilized in other types of mobile devices having WLAN capabilities. Moreover, similar methods may be utilized in other types of devices having WLAN capabilities, but that typically may not be considered mobile devices.

For instance, FIGS. 6A-6E, illustrate various devices in which WLAN scanning techniques such as described above may be employed.

Figure 6A:
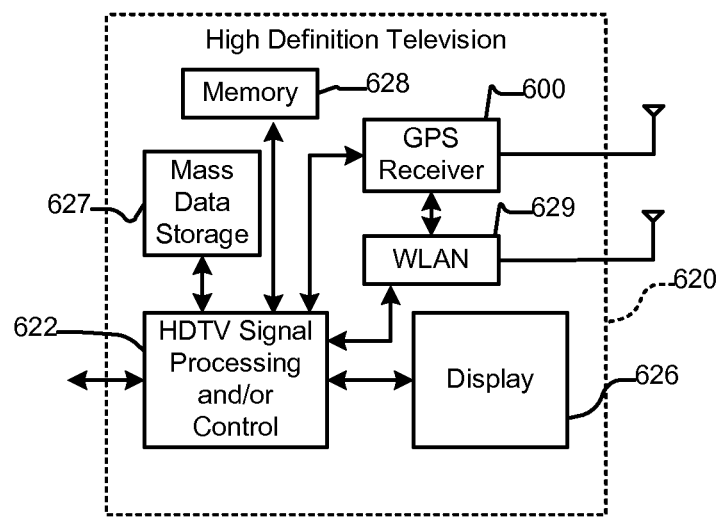
FIG. 6A is a block diagram of a high definition television that may utilize location awareness techniques such as described herein.

Referring now to FIG. 6A, such techniques may be utilized in a high definition television (HDTV) 620, such as an HDTV. HDTV 620 includes a mass data storage 627, an HDTV signal processing and control block 622, a memory 628, a WLAN interface 629 and a GPS receiver 600. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with a mass data storage 627 that stores data in a nonvolatile manner such as optical and/or magnetic storage devices. The mass storage device may be a mini HDD that includes one or more platters. HDTV 620 may be connected to memory 628 such as RAM, ROM, low latency nonvolatile memory such as flash memory and/or other suitable electronic data storage. HDTV 620 also may support connections with a WLAN via WLAN interface 629. One or more of the signal processing/control block 622, the WLAN interface 629, and the GPS receiver 600 may implement channel scanning techniques such as described above. For example, a WLAN scanning control unit (not shown) in one or more of the signal processing/control block 622, the WLAN interface 629, and the GPS receiver 600 may implement channel scanning techniques such as described above.

Figure 6B:
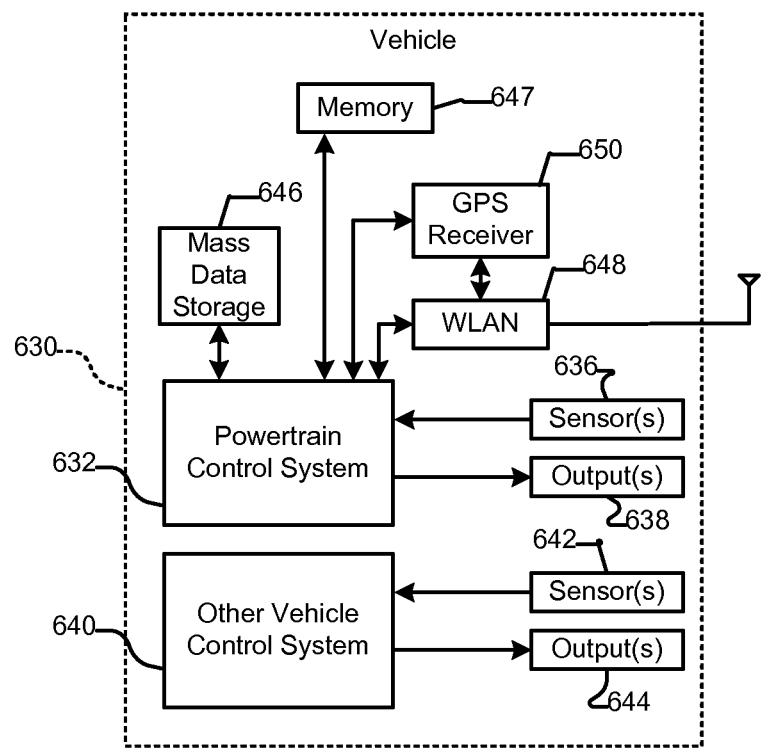
FIG. 6B is a block diagram of a vehicle that may utilize location awareness techniques such as described herein.

Referring now to FIG. 6B, such techniques may be utilized in a vehicle 630. The vehicle 630 includes a control system that may include mass data storage 646, a WLAN interface 648, and a GPS receiver 650. A powertrain control system 632 may receive inputs from one or more sensors 636 such as temperature sensors, pressure sensors, rotational sensors, airflow sensors and/or any other suitable sensors and generate one or more output control signals 638 such as engine operating parameters, transmission operating parameters, and/or other control signals.

Control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. In some implementations, the WLAN interface 648 and the GPS receiver 650 may be coupled to the control system 640. Control system 640 also may support connections with a WLAN via the WLAN interface 648. The WLAN interface 648 may be used when the vehicle is within access of one or more network access points.

Powertrain control system 632 may communicate with mass data storage 627 that stores data in a nonvolatile manner such as optical and/or magnetic storage devices. Powertrain control system 632 may be connected to memory 647 such as RAM, ROM, low latency nonvolatile memory such as flash memory and/or other suitable electronic data storage. Powertrain control system 632 also may support connections with a WLAN (not depicted) via a WLAN interface 648. One or more of the powertrain control system 632, the control system 640, the WLAN interface 648, and the GPS receiver 650 may implement channel scanning techniques such as described above. For example, a WLAN scanning control unit (not shown) in one or more of the powertrain control system 632, the control system 640, the WLAN interface 648, and the GPS receiver 650 may implement channel scanning techniques such as described above.

Figure 6C:
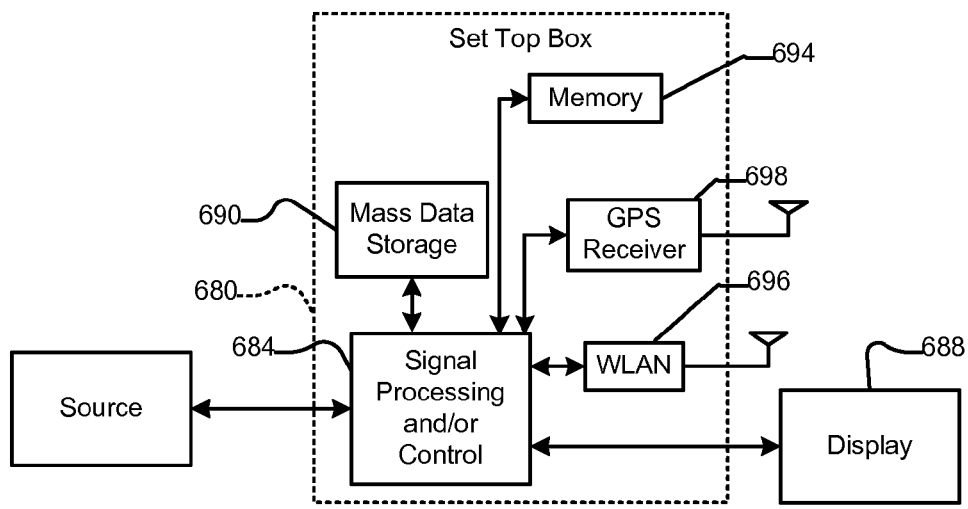
FIG. 6C is a block diagram of a set top box that may utilize location awareness techniques such as described herein.

Referring now to FIG. 6C, a set top box 680 may include signal processing and/or control circuits, which are generally identified in FIG. 6C at 684, and mass data storage 690. Set top box 680 also may include a WLAN interface 696 and a GPS receiver 698. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may include mass data storage 690 that stores data in a nonvolatile manner. Mass data storage 690 may include optical and/or magnetic storage devices for example hard disk drives HDD and/or DVDs. Set top box 680 may include memory 694 such as RAM, ROM, low latency nonvolatile memory such as flash memory and/or other suitable electronic data storage. Set top box 680 also may support connections with a WLAN via WLAN interface 696. One or more of the signal processing/control block 684, the WLAN interface 696, and the GPS receiver 698 may implement channel scanning techniques such as described above. For example, a WLAN scanning control unit (not shown) in one or more of the signal processing/control block 684, the WLAN interface 696, and the GPS receiver 698 may implement channel scanning techniques such as described above.

Figure 6D:
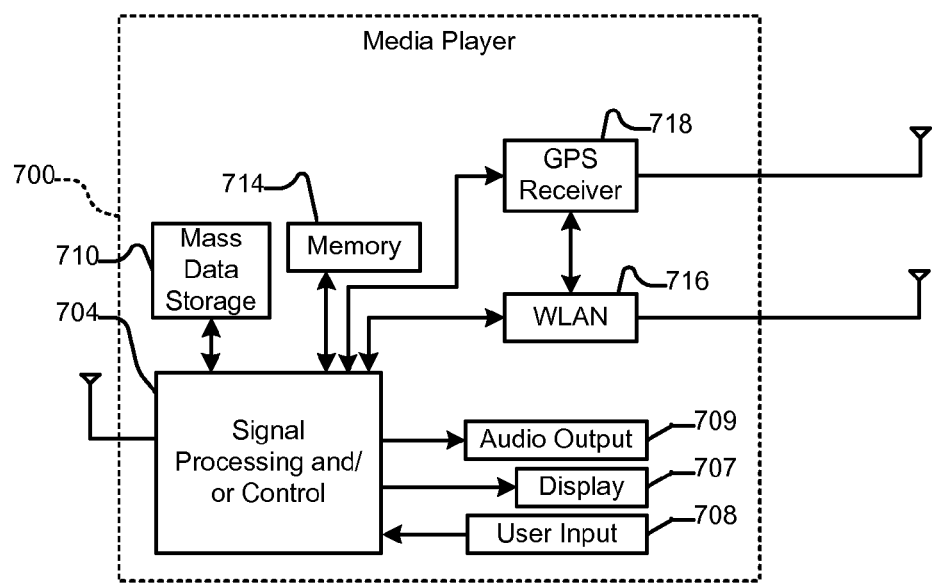
FIG. 6D is a block diagram of a media player that may utilize location awareness techniques such as described herein.

Referring now to FIG. 6D, a media player 700 may include either or both signal processing and/or control circuits, which are generally identified in FIG. 6D at 704, and/or mass data storage 710. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. Media player 700 may include memory 714 such as RAM, ROM, low latency nonvolatile memory such as flash memory and/or other suitable electronic data storage. Media player 700 also may support connections with a WLAN via a WLAN interface 716. Media player 700 also may include a GPS receiver 718. Communication via the WLAN interface 716 may be used to support real-time updates, downloading content, streaming of media content, etc. One or more of the signal processing/control block 704, the WLAN interface 716, and the GPS receiver 718 may implement channel scanning techniques such as described above. For example, a WLAN scanning control unit (not shown) in one or more of the signal processing/control block 704, the WLAN interface 716, and the GPS receiver 718 may implement channel scanning techniques such as described above.

Figure 6E:
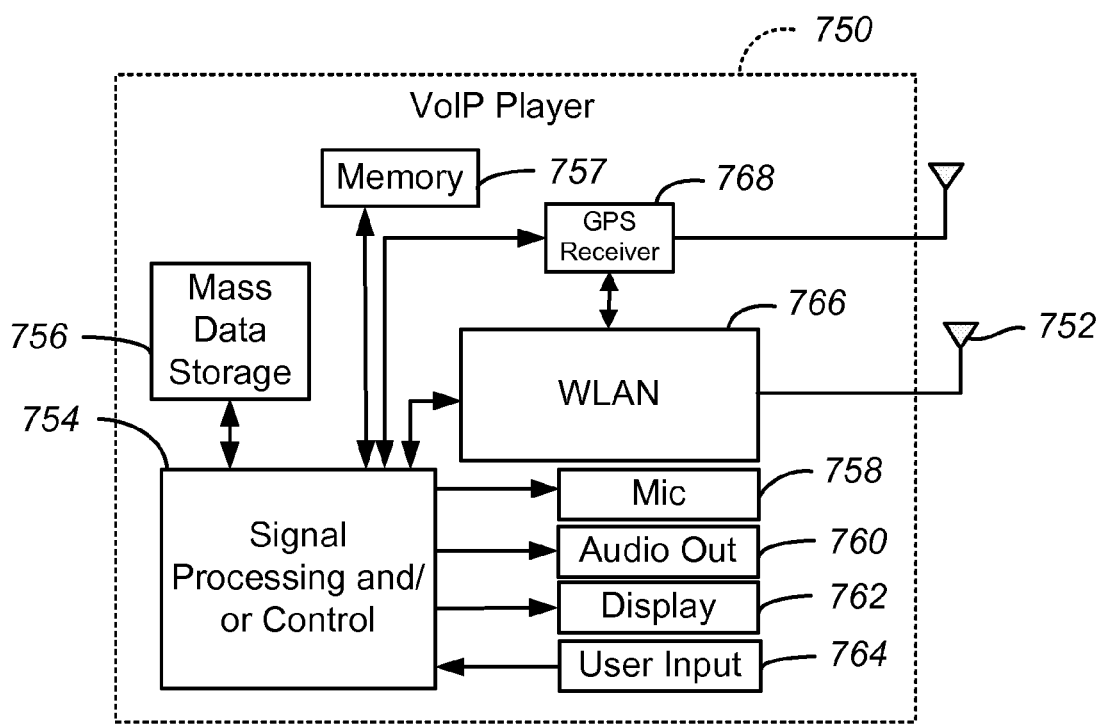
FIG. 6E is a block diagram of a voice over IP device that may utilize location awareness techniques such as described herein.

Referring to FIG. 6E, such techniques may be utilized in a Voice over Internet Protocol (VoIP) phone 750 that may include an antenna 752. The VoIP phone 750 may include either or both signal processing and/or control circuits, which are generally identified in FIG. 6E at 754, and mass data storage of the VoIP phone 750. In some implementations, VoIP phone 750 includes, in part, a microphone 758, an audio output 760 such as a speaker and/or audio output jack, a display monitor 762, an input device 764 such as a keypad, pointing device, voice actuation and/or other input devices.

VoIP phone 750 also may include a WLAN interface 766 and a GPS receiver 718. Signal processing and/or control circuits 754 and/or other circuits (not shown) in VoIP phone 750 may process data, perform coding and/or encryption, perform calculations, format data and/or perform other VoIP phone functions. One or more of the signal processing/control block 754, the WLAN interface 766, and the GPS receiver 768 may implement channel scanning techniques such as described above. For example, a WLAN scanning control unit (not shown) in one or more of the signal processing/control block 754, the WLAN interface 766, and the GPS receiver 768 may implement channel scanning techniques such as described above.

VoIP phone 750 may communicate with mass data storage 756 that stores data in a nonvolatile manner such as optical and/or magnetic storage devices, for example hard disk drives HDD and/or DVDs. VoIP phone 750 may be connected to memory 757, which may be a RAM, ROM, low latency nonvolatile memory such as flash memory and/or other suitable electronic data storage. VoIP phone 750 is configured to establish communications link with a VoIP network (not shown) via Wi-Fi communication module 766.

Although example communication devices were described above with reference to FIGS. 2 and 6A-6E, it will be understood that channel scanning techniques such as described above may be utilized in other types of devices as well, such as handheld gaming consoles, handheld mapping/positioning systems, personal digital assistants, etc.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
    determining, with a communication device, respective distances between the communication device and a plurality of wireless local area network (WLAN) access points, wherein determining the respective distances is based on position information corresponding to the plurality of WLAN access points and position information corresponding to the communication device;
    determining, with the communication device, a first WLAN access point, different from a second WLAN access point with which the communication device is currently associated, that is closest to the communication device, wherein the first WLAN access point is determined from the plurality of WLAN access points based on the determined respective distances;
    determining, with the communication device, whether a first distance between (i) the communication device and (ii) the second WLAN access point is greater than a second distance between (i) the communication device and (ii) the first WLAN access point;
    when it is determined that the first distance is greater than the second distance, initiating, with the communication device, a background scanning process that includes
        selecting, with the communication device, one of the plurality of WLAN access points with which the communication device is to associate based on the determined respective distances, including
            evaluating the plurality of WLAN access points in an order, wherein the order is based on the determined respective distances, wherein evaluating each WLAN access point includes determining if the WLAN access point is acceptable, and
            stopping evaluating the plurality of WLAN access points before all of the plurality of WLAN access points have been evaluated if an acceptable WLAN access point is determined.

2. The method of claim 1, further comprising receiving the position information corresponding to the plurality of WLAN access points.

3. The method of claim 2, wherein the position information corresponding to the plurality of WLAN access points is received from the second WLAN access point with which the communication device is currently associated.

4. The method of claim 1, wherein selecting one of the plurality of WLAN access points with which the communication device is to associate is further based on respective received signal strength indicators corresponding to the plurality of WLAN access points.

5. The method of claim 1, wherein selecting one of the plurality of WLAN access points with which the communication device is to associate is further based on respective channel load indicators corresponding to the plurality of WLAN access points.

6. The method of claim 1, wherein evaluating the plurality of WLAN access points is based on a plurality of received signal strength indicators associated with the plurality of WLAN access points.

7. The method of claim 1, wherein evaluating the plurality of WLAN access points is based on a plurality of channel load indicators associated with the plurality of WLAN access points.

8. The method of claim 1, further comprising:
    determining velocity information corresponding to the communication device; and initiating the acts of determining respective distances and selecting one of the plurality of WLAN access points based on the velocity information.

9. The method of claim 1, further comprising:
comparing, with the communication device, a velocity of the communication device to a threshold;
disabling the background scanning process based on comparing the velocity to the threshold; and
causing a WLAN interface of the communication device to go into a sleep mode based on comparing the velocity to the second threshold.

10. The method of claim 9, wherein disabling the background scanning process comprises not starting the background scanning process.

11. The method of claim 9, wherein disabling the background scanning process comprises disabling the background scanning process after the background scanning process has already started.

12. The method of claim 9, further comprising receiving the velocity information from a positioning system.

13. The method of claim 9, further comprising calculating, with the communication device, the velocity information based on position information indicating a position of the communication device.

14. The method of claim 13, further comprising receiving the position information indicating the position of the communication device from a positioning system.

15. The method of claim 1, wherein determining if each WLAN access point is acceptable is based on direction information indicating a direction in which the communication device is traveling.

16. The method of claim 15, further comprising determining the direction information based on position information corresponding to the communication device.

17. An apparatus, comprising:
a wireless local area network (WLAN) channel scanning control unit configured to
determine, based on position information corresponding to a plurality of WLAN access points and position information corresponding to a communication device, respective distances between the communication device and the plurality of WLAN access points,
determine a first WLAN access point, different from a second WLAN access point with which the communication device is currently associated, that is closest to the communication device, wherein the first WLAN access point is determined from the plurality of WLAN access points based on the determined respective distances,
determine whether a first distance between (i) the communication device and (ii) the second WLAN access point is greater than a second distance between (i) the communication device and (ii) the first WLAN access point, and
when it is determined that the first distance is greater than the second distance, initiate a background scanning process that includes
evaluating the plurality of WLAN access points in an order, wherein the order is based on the determined respective distances, wherein when evaluating each of the plurality of WLAN access points, the WLAN channel scanning control unit is configured to determine if the WLAN access point is acceptable,
stopping evaluating the plurality of WLAN access points if the WLAN channel scanning control unit determines an acceptable WLAN access point before the WLAN channel scanning control unit evaluates all of the plurality of WLAN access points, and
selecting one of the plurality of WLAN access points with which the communication device is to associate based on evaluating the plurality of WLAN access points.

18. The apparatus of claim 17, further comprising a positioning system to generate the position information corresponding to the communication device.

19. The apparatus of claim 17, further comprising a WLAN interface.

20. The apparatus of claim 19, wherein the position information corresponding to the plurality of WLAN access points is received using the WLAN interface.

21. The apparatus of claim 19, wherein the WLAN channel scanning control unit is a component of the WLAN interface.

22. The apparatus of claim 19, wherein the WLAN channel scanning control unit is coupled to the WLAN interface.

23. The apparatus of claim 17, wherein the WLAN channel scanning control unit is configured to determine if each WLAN access point is acceptable based on a received signal strength indicator corresponding to the WLAN access point.

24. The apparatus of claim 17, wherein the WLAN channel scanning control unit is configured to determine if each WLAN access point is acceptable based on a channel load indicator corresponding to the WLAN access point.

25. The apparatus of claim 17, wherein the WLAN channel scanning control unit is configured to:
compare a velocity of the communication device to a second threshold;
disable the background scanning process based on comparing the velocity to the second threshold; and
cause a WLAN interface of the communication device to go into a sleep mode based on comparing the velocity to the second threshold, by signaling from the WLAN scanning control unit to the WLAN interface.

26. The apparatus of claim 25, further comprising the WLAN interface.

27. The apparatus of claim 26, wherein the WLAN interface includes the WLAN channel scanning control unit.

28. The apparatus of claim 26, wherein the WLAN interface is coupled to the WLAN channel scanning control unit.

29. The apparatus of claim 26, further comprising a positioning system to generate the velocity information.

30. The apparatus of claim 26, further comprising a positioning system to generate position information indicating a position of the communication device;
wherein the WLAN channel scanning control unit is configured to calculate the velocity information based on the position information indicating the position of the communication device.

31. The apparatus of claim 17, wherein the WLAN channel scanning control unit is configured to determine if each WLAN access point is acceptable based on direction information indicating a direction in which the communication device is traveling.

32. The apparatus of claim 31, further comprising a positioning system to generate position information corresponding to the communication device;
wherein the WLAN channel scanning control unit is configured to determine the direction information based on the position information corresponding to the communication device.

* * * * *